US012785947B2

United States Patent
(12) United States Patent
Lee et al.

(10) Patent No.: US 12,785,947 B2
(45) Date of Patent: Nov. 3, 2026

(54) CONFIGURABLE MODULE-LATTICE POST-QUANTUM CRYPTOGRAPHY PROCESSOR FOR KEY-ENCAPSULATION MECHANISM

(71) Applicant: Inha University Research and Business Foundation, Incheon (KR)

(72) Inventors: Hanho Lee, Incheon (KR); Hyunseon Kim, Incheon (KR)

(73) Assignee: INHA UNIVERSITY RESEARCH AND BUSINESS FOUNDATION, Incheon (KR)

( * ) Notice: Subject to any disclaimer, the term of this patent is extended or adjusted under 35 U.S.C. 154(b) by 23 days.

(21) Appl. No.: 18/922,775

(22) Filed: Oct. 22, 2024

(65) Prior Publication Data

US 2025/0337567 A1 Oct. 30, 2025

(30) Foreign Application Priority Data

Apr. 30, 2024 (KR) ........................ 10-2024-0058121

(51) Int. Cl.
*H04L 9/08* (2006.01)
*H04L 9/06* (2006.01)

(52) U.S. Cl.
CPC .......... *H04L 9/0852* (2013.01); *H04L 9/0618* (2013.01)

(58) Field of Classification Search
None
See application file for complete search history.

(56) References Cited

U.S. PATENT DOCUMENTS 11,563,586 B2 * 1/2023 Mukherjee ............ H04L 9/3247
2013/0243187 A1 * 9/2013 Horstmeyer ............. G09C 1/00 380/28

(Continued)

FOREIGN PATENT DOCUMENTS

KR 102462395 B1 * 11/2022 ............... H04L 9/12

OTHER PUBLICATIONS

Saarinen (Saarinen et al., "Ring-LWE Ciphertext Compression and Error Correction: Tools for Lightweight Post-Quantum Cryptography", Asia CCS '17: ACM Asia Conference on Computer and Communications Security, ISBN 978-1-4503-4969-7, Apr. 2017), (Year: 2017).*

(Continued)

*Primary Examiner* — Piotr Poltorak
(74) *Attorney, Agent, or Firm* — ArentFox Schiff LLP; Joseph M. Maraia

(57) ABSTRACT

Disclosed is a reconfigurable module-lattice-based key encapsulation mechanism (ML-KEM) post-quantum cryptography system and method using memory-based numbers theoretic transform (NTT). A post-quantum cryptography method of a post-quantum cryptography system including a plurality of internal submodules includes reconfiguring the plurality of internal submodules by variably selecting one security level from among the plurality of security levels; reconfiguring execution of the plurality of internal submodules to be changed through a main controller; and variably processing data according to the selected security level to perform key generation, encapsulation, and decapsulation through the reconfigured plurality of internal submodules.

1 Claim, 12 Drawing Sheets

(56) References Cited

U.S. PATENT DOCUMENTS

| | | | | |
|---|---|---|---|---|
| 2014/0105403 | A1* | 4/2014 | Baldi | H04L 9/304<br>380/282 |
| 2018/0176015 | A1* | 6/2018 | Wang | H04L 9/0825 |
| 2022/0078011 | A1* | 3/2022 | Garcia Morchon | H04L 9/3093 |

OTHER PUBLICATIONS

Cheng (Cheng et al., "Semi-device0independent quantum random number generator with a broadband squeezed stat of light", Quantum Information 10, article No. 20, Feb. 2024), (Year: 2024).*

Derya (Derya et al., "CoHA-NTT: A Configurable Hardware Accelerator for NTT-based Polynomial Multiplication", Microprocessors & Microsystems, ISSN:0141-9331, vol. 89, issue C, Jan. 2022), (Year: 2022).*

Putranto (Putranto et al., "Space and Time-Efficient Quantum Multiplier in Post Quantum Cryptography Era", in IEEE Access, vol. 11, pp. 21848-21862, Mar. 2023). (Year: 2023).*

Nguyen et al., "Area-Time Efficient Hardware Architecture for Crystals-Kyber," Appl. Sc., vol. 12, pp. 1-10, 2022.

* cited by examiner

CONFIGURABLE MODULE-LATTICE POST-QUANTUM CRYPTOGRAPHY PROCESSOR FOR KEY-ENCAPSULATION MECHANISM

CROSS-REFERENCE TO RELATED APPLICATION(S)

This application claims the priority benefit of Korean Patent Application No. 10-2024-0058121, filed on Apr. 30, 2024, in the Korean Intellectual Property Office, the disclosure of which is incorporated herein by reference.

BACKGROUND

1. Field of the Invention

The following description of example embodiments relates to a reconfigurable module-lattice-based key encapsulation mechanism (ML-KEM) post-quantum cryptography system and method using memory-based numbers theoretic transform (NTT).

2. Description of the Related Art

A variety of cutting-edge technology, such as Internet of things (IoT), artificial intelligence (AI), next-generation communication, and autonomous driving, has brought changes to our daily lives. As the use of connected devices becomes more common in everyday life and corporate environments, sensitive personal information and corporate information are often exchanged through online communication, and it is critical to ensure secure transmission of data to protect personal information and to prevent unauthorized access.

Public key cryptography, such as Rivest, Sharmir, and Adleman (RSA) and elliptic curve cryptosystem (ECC), is currently used to transmit an encryption key used in communication. This is based on mathematical difficulty, such as prime factorization (PF) and discrete logarithm problem (DLP) and thus, may be deciphered in polynomial time by a quantum algorithm, such as Shor's algorithm, with the advent of commercialization of quantum computers. Therefore, a new cryptography system is required.

As the risk for the existing cryptography system increases, the need for a new encryption algorithm, that is, post-quantum cryptography (PQC) is also growing. Therefore, the U.S. National Institute of Standards and Technology (NIST) held the contest on post-quantum cryptography to protect against attacks by quantum computers, and, in key exchange/encryption field for exchanging encryption keys for secret key cryptography, lattice-based post-quantum cryptography, that is, module-lattice-based key encapsulation mechanism (ML-KEM) is finally selected and standardization is in progress.

The ML-KEM generates a secret shared key as a type of a public key cryptography algorithm. It is a method using a module-learning with error (LWE) technique and includes a matrix A containing random elements in a polynomial ring and secret vector value s, and error value e, and provides various security levels (stages 1, 3, and 5) by changing a parameter k value.

The ML-KEM requires a large computational amount since a size of a secret key and a size of a public key used are large. Also, as a security level increase, a large amount of computation and resources are used, which makes implementation difficult. Also, since a large amount of time is used to encrypt/decrypt data, it is difficult to be used for an actual cryptography system.

Reference material includes Korean Patent Registration No. 10-2462395, registered on Oct. 28, 2022.

SUMMARY

Example embodiments may provide an encryption and decryption method and system for module-lattice-based key encapsulation mechanism (ML-KEM) post-quantum cryptography that supports three security levels (stages 1, 3, and 5), has low complexity and operates in a reconfigurable manner. In particular, example embodiments provide key generation, encapsulation, and decapsulation for various security levels (stages 1, 3, and 5) by variably operating a hardware architecture using a main controller. Also, example embodiments include a configurable memory-based numbers theoretic transform (NTT) that supports all of an NTT operation and an inverse NTT operation to use a small number of resources and aim to process key generation, encapsulation, and decapsulation operations at high speed by applying two modular reduction high-speed computation method to repetitive operations and multiplication and addition.

According to an aspect, a reconfigurable ML-KEM post-quantum cryptography system using memory-based NTT proposed herein reconfigures a plurality of internal submodules by variably selecting one security level from among a plurality of security levels, reconfigures execution of the plurality of internal submodules to be changed through a main controller, and variably processes data according to the selected security level to perform key generation, encapsulation, and decapsulation through the reconfigured plurality of internal submodules, and the plurality of internal submodules includes a hash sampler module configured to generate a pseudo-random number using an arbitrary input or a public seed input from a key decoder and to output the same through a squeeze function; a binomial sampler module configured to process bits differently depending on security levels and to generate an error using the pseudo-random number that is input using a subtraction operation, as a sampling method using the principle of polynomial distribution; a rejection sampler module configured to generate a polynomial matrix and a transpose matrix for public key generation and encryption using a method of receiving the pseudo-random number and performing extraction and rejection for the sampling, as a sampling method using the principle of probability distribution; a key encoder configured to perform encoding with a public key and a secret key; a key decoder configured to perform decoding on the public key and the secret key; a message encoder configured to convert elements of a polynomial ring of the polynomial matrix to a message in bytes; a message decoder configured to convert a mask of the message in bytes acquired as a result of operation to elements of the polynomial ring; a compress configured to output the input ciphertext in a format for transmission through compression according to a security level; a decompress configured to receive the compressed ciphertext and decompress compression of data according to a security level to reduce an error rate and to fit the elements of the polynomial ring; an integrated numbers theoretic transform (NTT) & inverse NTT (INTT) module configured to receive output of the binomial sampler and the decompress as input and to perform NTT and INTT operations; and a point-wise multiplier and adder configured to perform a bow-tie multiplication operation and addition of polynomial values using a plurality of multipliers and a plurality of adders.

The hash sampler module uses a padding module of a Keccak algorithm, f-permutation, and squeeze, and controls an operation and the number of operations depending on the status of the rejection sampler module and the binomial sampler module.

The rejection sampler module receives output of the hash sampler module in predetermined bit units and passes two random integers less than a modulus value that is a maximum value of a polynomial coefficient, and the binomial sampler module receives the output of the hash sampler module in predetermined bit units, converts bit masking according to each security level, generates a secret vector value and an error value using the subtraction operation, and generates a coefficient value according to central polynomial distribution.

The integrated NTT&INTT module performs multi-stage processing through a plurality of processing elements (PEs) and the PEs sequentially performs a reduction operation after the multiplication operation.

The point-wise multiplier and adder includes a bow-tie multiplier, adder and random access memory (RAM), and performs a variable accumulation operation depending on a matrix size of data according to a security level.

The compress performs shift, addition, and division operations on operation results within an encryption process according to a security level, compresses and encodes a size of the ciphertext through serialization in predetermined bit units, and the decompress performs multiplication, addition, and shift operations on operation results within a decryption process, decompresses and decodes data to be operable through conversion to elements of a ring.

According to another aspect, a reconfigurable ML-KEM post-quantum cryptography method using memory-based NTT proposed herein includes reconfiguring a plurality of internal submodules by variably selecting one security level from among the plurality of security levels; reconfiguring execution of the plurality of internal submodules to be changed through a main controller; and variably processing data according to the selected security level to perform key generation, encapsulation, and decapsulation through the reconfigured plurality of internal submodules.

According to example embodiments, through an encryption and decryption method and system for ML-KEM post-quantum cryptography, it is possible to support three security levels (stages 1, 3, and 5) and to be reconfigurable with low complexity. In particular, it is possible to provide key generation, encapsulation, and decapsulation for various security levels (stages 1, 3, and 5) by variably operating a hardware architecture using a main controller, and, through a reconfigurable NTT that supports all of an NTT operation and an inverse NTT, it is possible to process key generation, encapsulation, and decapsulation operations at high speed by applying two modular reduction high-speed computation method to repetitive operations and multiplication and addition. Also, there is an effect in performing a variable operation (key generation, encapsulation, and decapsulation) for three security levels using a small number of resources. Here, memory-based configurable NTT&INTT uses a relatively small number of resources compared to pipeline-based NTT.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
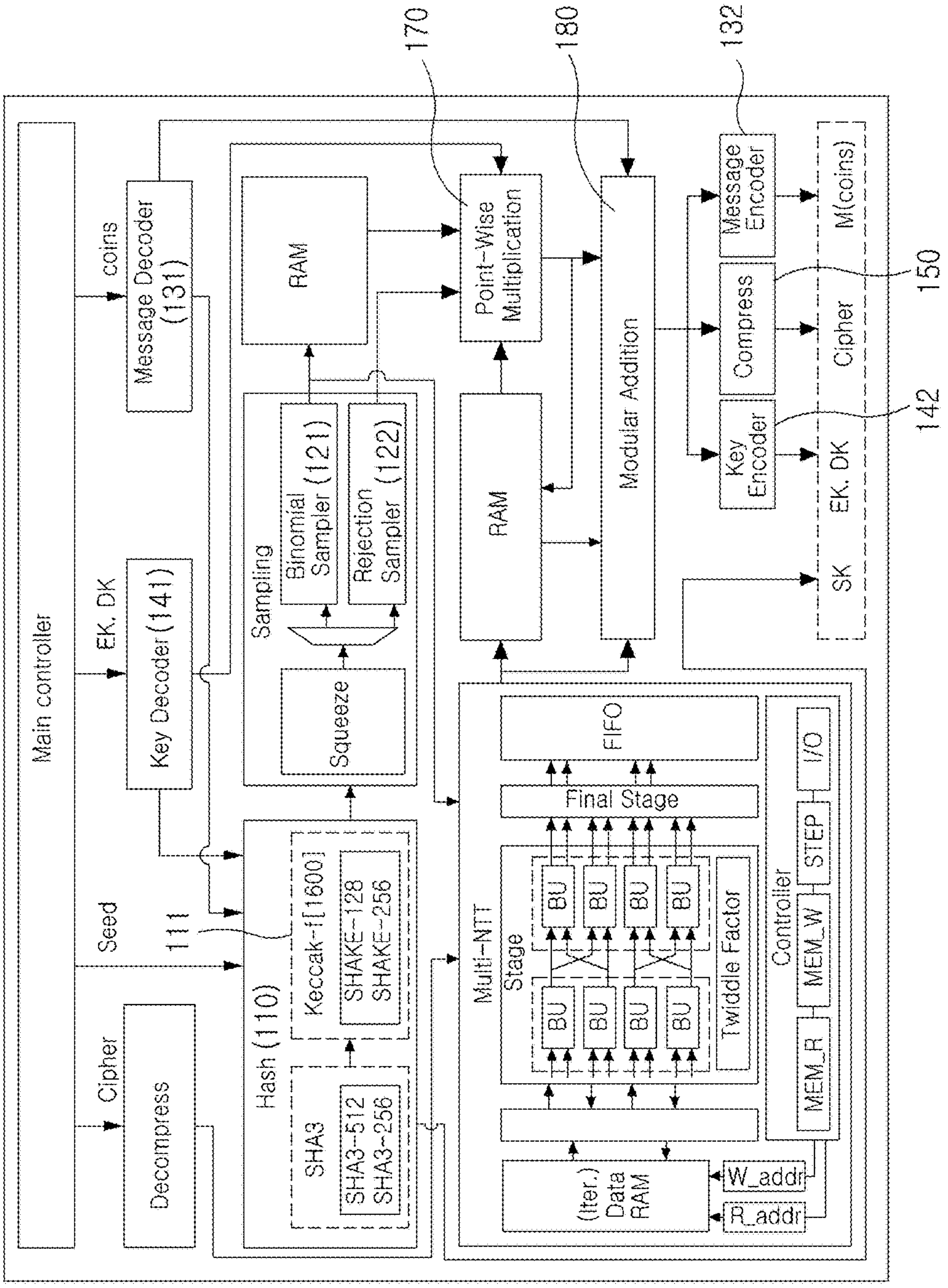
FIG. 1 illustrates a configuration of a module-lattice-based key encapsulation mechanism (ML-KEM) post-quantum cryptography system using memory-based numbers theoretic transform (NTT) according to an example embodiment.

Hereinafter, some example embodiments will be described in detail with reference to the accompanying drawings.

A module-lattice-based key encapsulation mechanism (ML-KEM) post-quantum cryptography system presented herein is a lattice-based PKE/KEM public key encryption method. A lattice-based encryption algorithm is an NP-hard-based encryption algorithm that makes it difficult to find a specific vector on a lattice present in an n-dimensional space and uses a Ring-learning with error (LWE) method. LWE refers to a public key encryption technique based on a shortest vector problem (SVP) in a polynomial and injects a small error during an encryption process. Here, although a key is repeatedly used, different encryption values are acquired and the ciphertext has higher security than before.

However, Ring-LWE uses a large key and has high time complexity since a convolution operation, multiplication of polynomials, is performed.

$$q \bmod 2N = 1 \quad \text{(Equation 1-1)}$$

Ring-LWE performs encryption within $R_a = Z_a\lfloor x \rfloor / f(x)$ that is a polynomial ring. The denominator f(x) has the form of $f(x)=x^N+1$ and q denotes a modulus value that indicates a maximum value of a polynomial coefficient and is as shown in (Equation 1-1). A parameter N value may be expressed in the form of a power of 2, such as $N=2^m$. The public key encryption method, Ring-LWE, includes a public key used for encryption and a private key used for decryption. Ring-LWE is as shown in (Equation 1-2) and generates a public key and a private key using random values, such as public matrix a, a secret key s, and an error value e with a Gaussian distribution.

$$a \times s + e = b \quad \text{(Equation 1-2)}$$

Using the generated public key and private key, encryption is performed as shown in (Equation 1-3), and a message m is encrypted using the public key (a, b) and the ciphertext ($c_1$, $c_2$) is output. Here, when performing encryption, additional error values $e_1$, $e_2$, and $e_3$ are used. Therefore, although the public key (a, b) is used, different values may be acquired, which leads to high security.

$$c_1 = a \times e_1 + e_2,\ c_2 = b \times e_1 + e_3 + m \quad \text{(Equation 1-3)}$$

Decryption outputs the message m from the ciphertext ($c_1$, $c_2$) using the secret key s related to the public key (a, b) used for encryption, and the decryption is as shown in (Equation 1-4).

$$m = s \times c_1 + c_2 \quad \text{(Equation 1-4)}$$

As such, core operations of Ring-LWE are polynomial multiplication and addition and has high time complexity since the polynomial multiplication performs a convolution operation. To address this, a number theoretic transform (NTT) algorithm that applies fast Fourier transform (FFT) to a finite ring is used for the convolution operation. Module-LWE, which is one type of Ring-LWE, is defined as a Ring-LWE-based polynomial $R_a = Z_a\lfloor x \rfloor / f(x)$. Therefore, a length N of the polynomial or a size of modulus q needs to be converted to increase a security level. This change in the polynomial ring requires a change in a configuration of an internal operator, such as an NTT algorithm that performs a polynomial multiplication operation or a modular reduction for a modular operation. As a result, Ring-LWE requires a change in an internal operation structure depending on security levels and does not have flexibility in terms of a security level. To address this, Module-LWE is configured as shown in (Equation 1-5).

$$b^k = a^{k \times k} \times s^k + e^k \quad \text{(Equation 1-5)}$$

Unlike Ring-LWE, Module-LWE includes k vectors for the public key (a, b), the secret key s, and the error value e. This method may meet various security levels using the same internal operator by adjusting a parameter k value that represents the number of polynomials and the size of a matrix and a vector without changing the polynomial ring.

FIG. 1 illustrates a configuration of an ML-KEM post-quantum cryptography system using memory-based NTT according to an example embodiment.

The ML-KEM post-quantum cryptography system using memory-based NTT according to an example embodiment performs a key generation process, an encapsulation process, and a decapsulation process using an internal operation module, and provides different security levels depending on data throughput.

A module-LWE processor according to an example embodiment includes a hash sampler module 110, a binomial sampler module 121, a rejection sampler module 122, a message decoder 131, a message encoder 132, a key decoder 141, a key encoder 142, a decompress 151, a compress 152, an integrated NTT&INTT module 160, a point-wise multiplier and adder 170, and an internal operation module 180.

The hash sampler module 110 according to an example embodiment is implemented using an f-permutation function of a Keccak algorithm, generates a pseudo-random number using an arbitrary input or a public seed input from a key decoder, and outputs the same through a squeeze function.

The rejection sampler module 122 that is one of sampler modules according to an example embodiment refers to a sampling method using the principle of probability distribution, and is used to generate a polynomial matrix and a transpose matrix for public key generation and encryption using a method of receiving the pseudo-random number and performing extraction and rejection for corresponding sampling.

The binomial sampler module 121 that is one of sampler modules according to an example embodiment refers to a sampling method using the principle of polynomial distribution, and is used to processes bits differently depending on security levels and to generate an error using the pseudo-random number that is input using a subtraction operation.

The message encoder 132 according to an example embodiment converts elements of a received polynomial ring to a message in bytes.

The message decoder 131 according to an example embodiment converts a message in bytes acquired as a result of operation to elements of the polynomial ring.

The compress 152 according to an example embodiment outputs the input ciphertext in a format that is easy to transmit through compression according to a security level.

The decompress 151 according to an example embodiment receives the compressed ciphertext and decompresses compression of data according to its security level to reduce an error rate and to fit the elements of the polynomial ring.

The integrated NTT&INTT module 160 according to an example embodiment receives output of the binomial sampler 121 and the decompress 151 as input and performs NTT and INTT operations.

The point-wise multiplier and adder 170 according to an example embodiment performs a bow-tie multiplication operation and addition of polynomial values using five multipliers and four adders.

Figure 2:
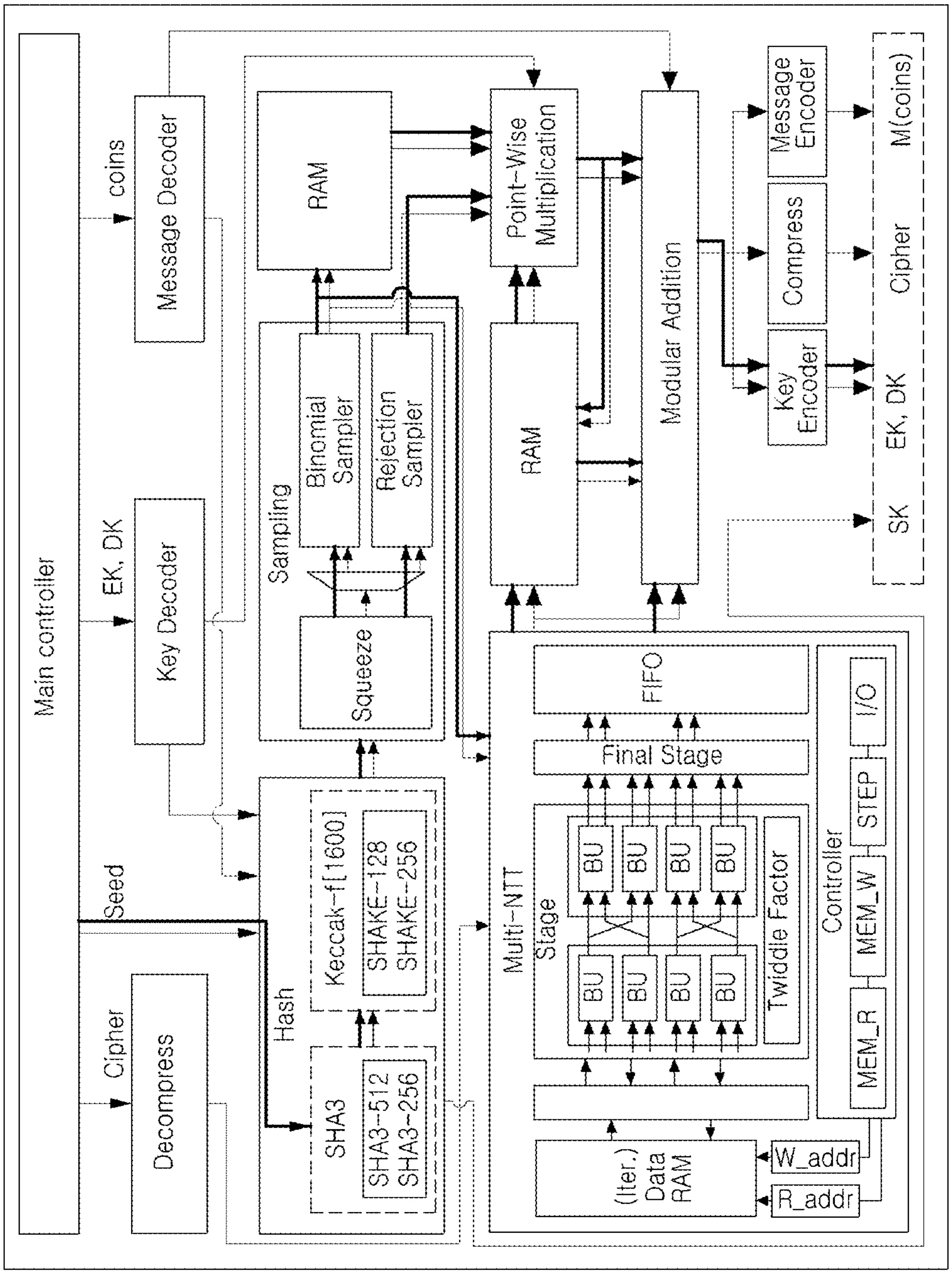
FIG. 2 illustrates a key generation process of an ML-KEM post-quantum cryptography system using memory-based NTT according to an example embodiment.

FIG. 2 illustrates a key generation process of an ML-KEM post-quantum cryptography system using memory-based NTT according to an example embodiment.

According to an example embodiment, a first seed is received and a random value (ρ, σ) is generated through a hash sampler module. Then, a public matrix $\hat{A}$, a secret vector value s, and an error value e are generated using a binomial sampler and a rejection sampler. Since a matrix needs to be generated according to a security level, repeated operations are performed according to an N value for a security level. Here, the secret vector value s and the error value e generated by the binomial sampler are converted to $\hat{S}$ and ê, respectively, which are values on an NTT domain, through an NTT operation by an integrated NTT&INTT module and stored in RAM to be used to perform a Ring-LWE process later. A public value is generated by the rejection sampler and $\hat{A}$ generated in this way is stored in RAM and then used together with $\hat{S}$ and ê later. Afterwards, after initially performing polynomial multiplication on $\hat{A}$ and $\hat{S}$, polynomial addition with ê is performed. When a value required for the polynomial multiplication is stored in RAM, a point-wise multiplier modules reads the values stored in RAM and performs the polynomial multiplication. Then, an adder module computes a $\hat{t}$ value that is used to configure an encapsulation key value using a result value for an $\hat{A}\times\hat{s}$ operation and an ê value stored in RAM. A random value ρ and a vector value $\hat{t}$ are used to generate an encryption key that is an intermediate key value through encoding and to generate a decryption key that is an intermediate key value through encoding. Then, an encapsulation key uses the encryption key and outputs the sum of a decapsulation decryption and encryption key, an encryption key that re-performs the hash sampler module, and the initially input seed value.

Figure 3:
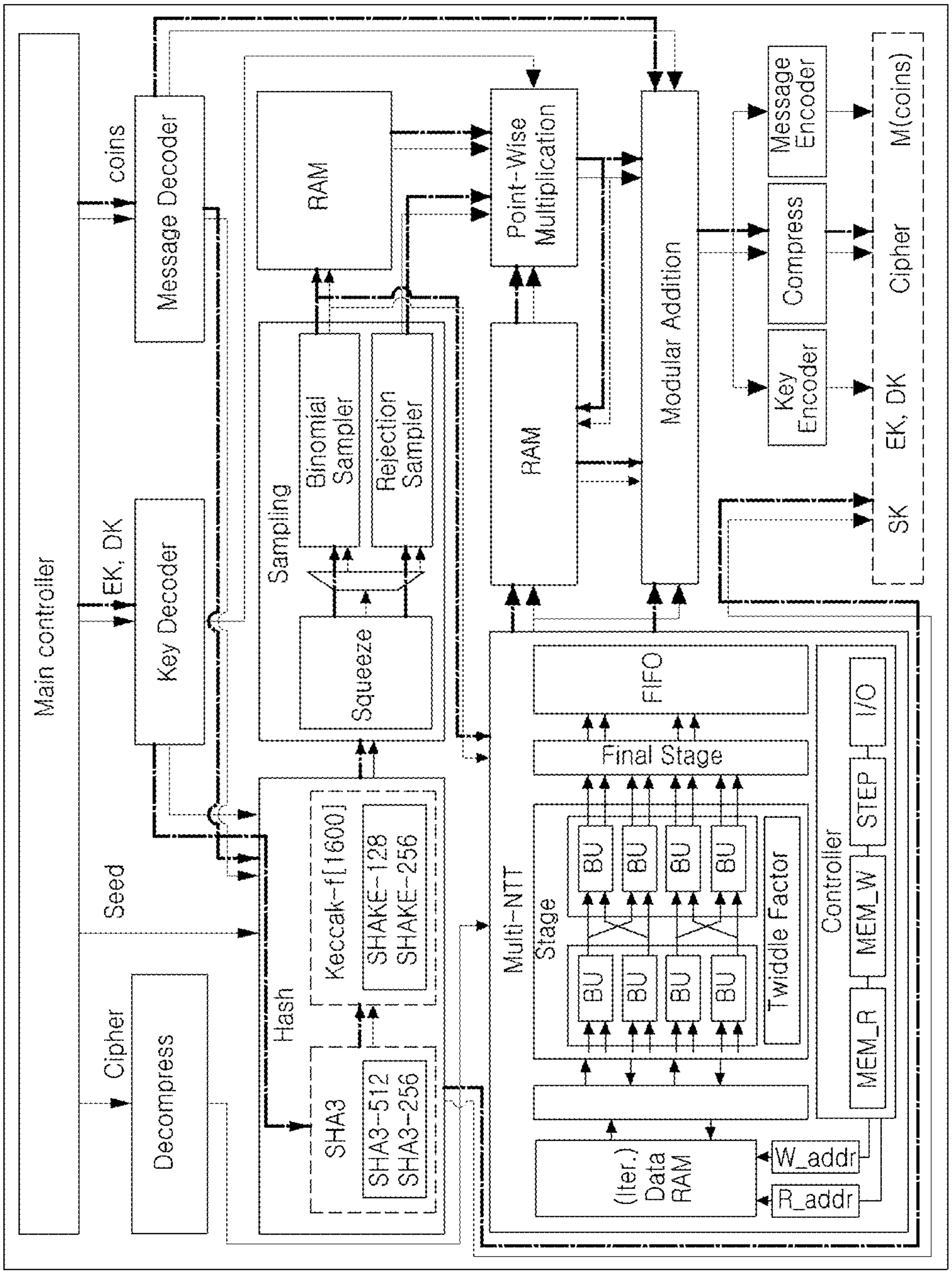
FIG. 3 illustrates an encapsulation process of an ML-KEM post-quantum cryptography system using memory-based NTT according to an example embodiment.

FIG. 3 illustrates an encapsulation process of an ML-KEM post-quantum cryptography system using memory-based NTT according to an example embodiment.

According to an example embodiment, a random coin value and an encapsulation key are received as input, and a shared secret key and a random value r necessary for encryption are acquired through a hash sampler module. The shared secret key is output as is and delivered to a user, and encryption is performed using the coin value, the random value r, and the encapsulation key. A random value ρ is acquired using the encapsulation key and a vector value $\hat{t}$ is acquired through a key decoder. Then, a public matrix $\hat{A}$ value is acquired using the random value ρ and internal counters i and j, through the hash sampler module and a rejection sampler module. The acquired public matrix $\hat{A}$ is stored in RAM and used for Ring-LWE operation. Also, with the random value r and internal counter N, values r, e1, and e2 are acquired through the hash sampler module and a binomial sampler. Here, the generated r value is used to acquire a value of $\hat{r}$ that is a value on the NTT domain by performing an NTT operation in an integrated NTT&INTT module, and the corresponding value and $\hat{A}^T$ stored in RAM are used to perform polynomial multiplication in a point-wise multiplier module. A result value performed by the point-wise multiplier module is converted to the existing domain through an INTT operation in the integrated NTT/INTT module. Then, with the converted value and the error value $e_1$, a modular addition module acquires a result value μ of Ring-LWE by performing an addition operation. The acquired μ value is used for $c_1$ to configure a ciphertext c value through compression and encoding in a compress module. To acquire a remaining $c_2$ value that constitutes the ciphertext c, an input coin goes through a decoding process and a decompression process in a message decoder module to acquire a μ value. Then, with a value input in an initial stage and the μ value, the point-wise multiplier module performs polynomial multiplication and then, the integrated NTT&INTT module converts the same to the existing domain value through an INTT operation. Then, a v value is acquired by performing an addition operation on the converted value and values $e_2$ and μ in a modular addition module. Here, using RAM inside ML-KEM architecture, data related to input and output is managed during operation. The acquired v value is used for $c_2$ through a compression process and an encoding process in the compress module. The compress module combines $c_1$ and $c_2$ and outputs the ciphertext c value. Here, the same coin value is used, but a size of a key used and a size of ciphertext output may vary depending on security levels.

Figure 4:
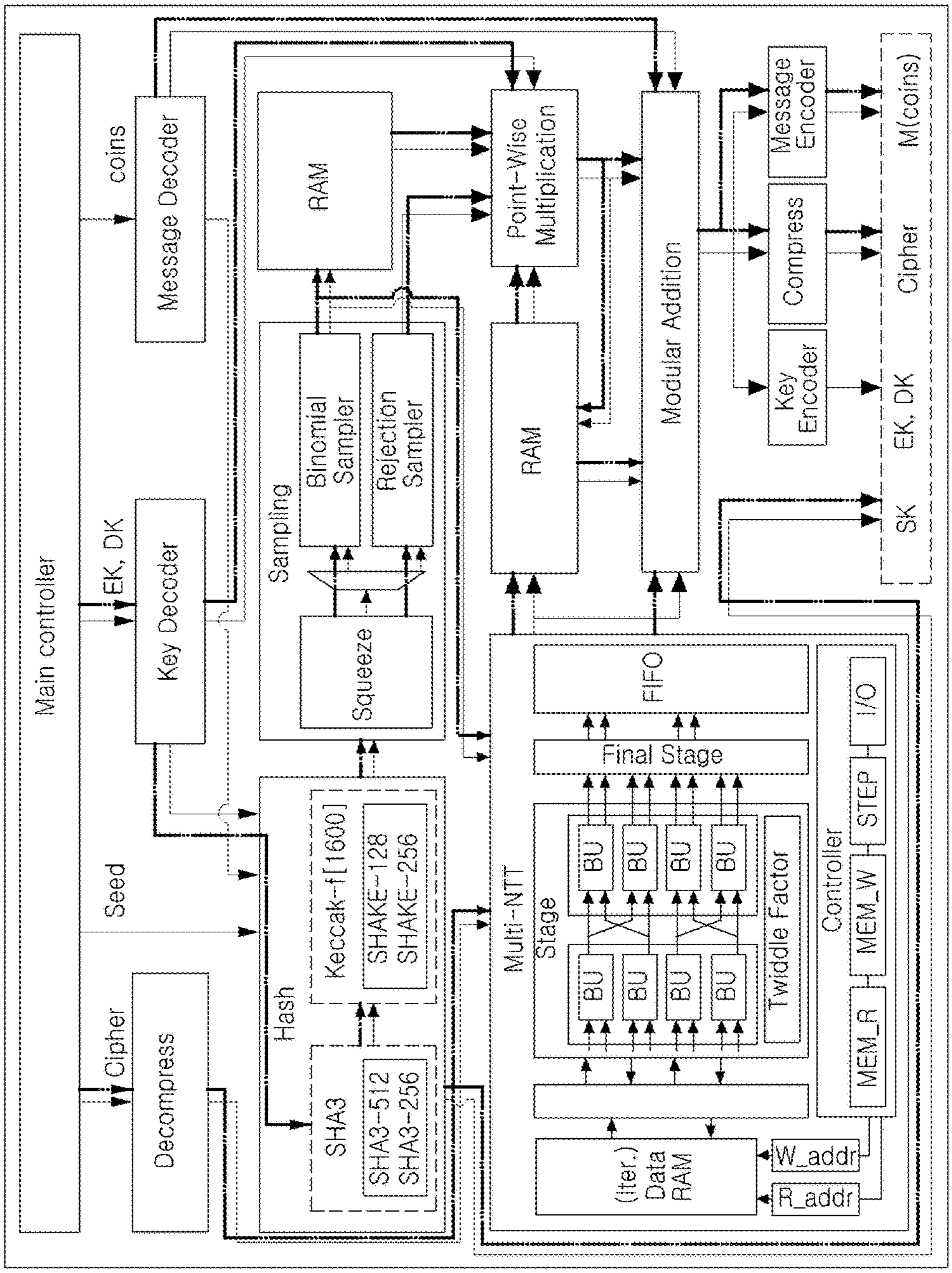
FIG. 4 illustrates a decapsulation process of an ML-KEM post-quantum cryptography system using memory-based NTT according to an example embodiment.

FIG. 4 illustrates a decapsulation process of an ML-KEM post-quantum cryptography system using memory-based NTT according to an example embodiment.

According to an example embodiment, the input ciphertext c acquires u and v values through a decoding process and a decompression process in a decompress module, and an input decapsulation key acquires $\hat{S}$ through a key decoder module. The u value is used to perform an NTT operation in an integrated NTT&INTT module and to perform a polynomial multiplication operation with an $\hat{S}$ value in a point-wise multiplication module. A w value is acquired by performing polynomial addition (subtraction) on the generated value and the v value in a modular addition module. The acquired w value may be used to acquire a coin value that is an initial message value through a compression process and an encoding process in a message encoder module.

Using the coin value acquired in the encryption process, a shared secret key and a random value r are acquired in a hash sampler module. Here, the acquired random value r and shared secret key are the same as values acquired in an intermediate encapsulation process. To verify whether the input ciphertext is correct, the encryption process in which the acquired coin value is input as a random message value, a portion of a decapsulation key value is input as a ciphertext key value, and the random value r is input as a seed value is performed. The encryption process is performed in the same manner as described in encapsulation and whether a ciphertext c' value output in the encryption process and the input ciphertext c value are the same is determined. If the values are the same, it represents that there is no error in modification of the ciphertext or ML-KEM architecture. Here, a size of a decapsulation key used varies depending on security levels.

Figure 5:
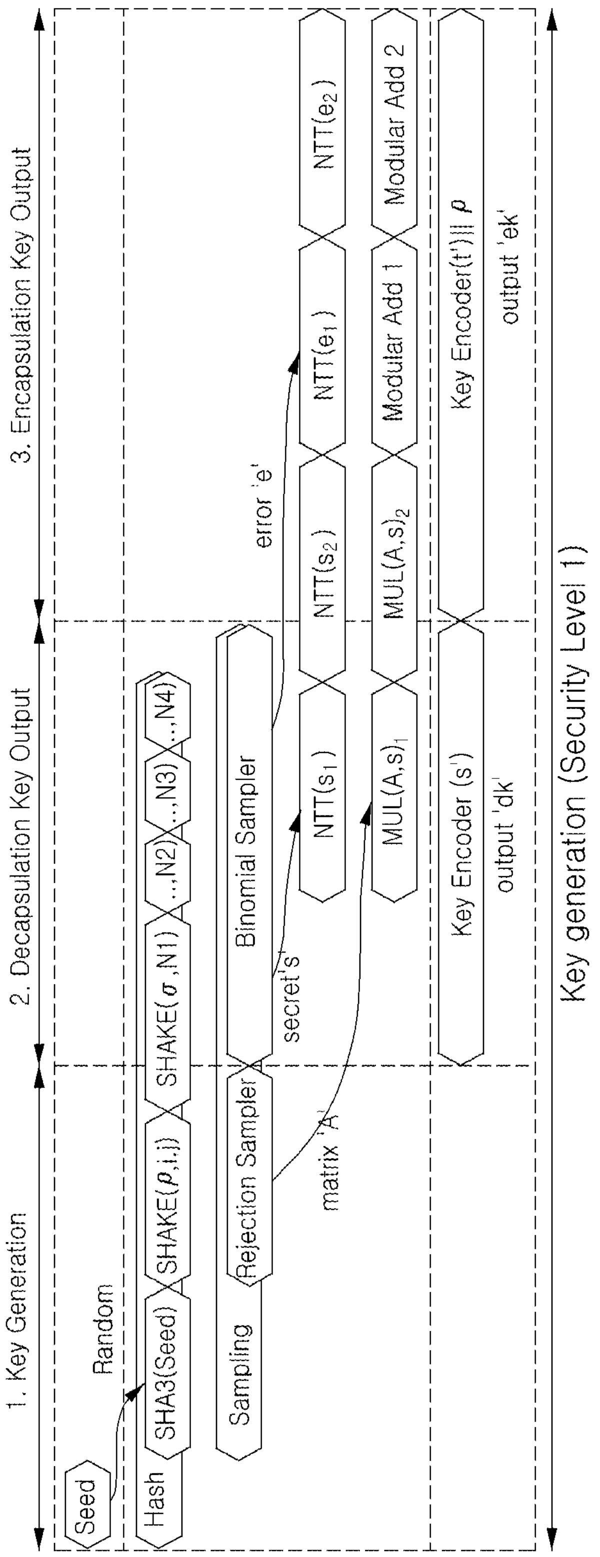
FIG. 5 illustrates data flow of a key generation process of an ML-KEM post-quantum cryptography system using memory-based NTT according to an example embodiment.

FIG. 5 illustrates data flow of a key generation process of an ML-KEM post-quantum cryptography system using memory-based NTT according to an example embodiment.

Referring to FIG. 5, a hash sampler module receives a random seed value as input to generate an intermediate random value and, using the corresponding value, a rejection sampler generates a transpose matrix A, and a binomial sampler generates error values s and e. The error values s and e are converted to an NTT domain through an integrated NTT&INTT module and polynomial addition, and multiplication are performed using a point-wise multiplier and adder along with the transpose matrix A. Here, polynomial multiplication is performed by storing an operation result value in RAM. Then, generated values are used to generate an encapsulation key and a decapsulation key in byte units using a key encoder. Here, a security level is provided by adjusting the number of times the transpose matrix A and the error values s and e are repeatedly generated.

Figure 6:
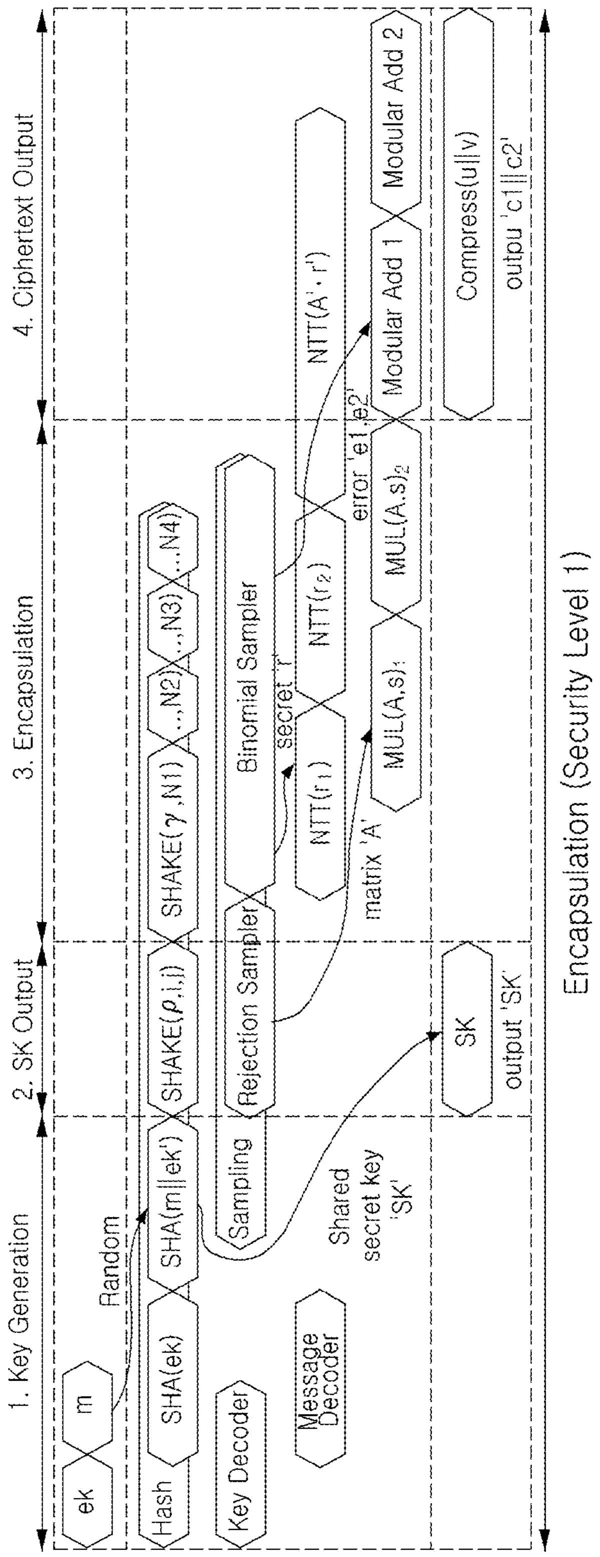
FIG. 6 illustrates data flow of an encapsulation process of an ML-KEM post-quantum cryptography system using memory-based NTT according to an example embodiment.

FIG. 6 illustrates data flow of an encapsulation process of an ML-KEM post-quantum cryptography system using memory-based NTT according to an example embodiment.

FIG. 6 illustrates a process of receiving a message coin value and an encapsulation key that a user desires to encrypt and generating a shared secret key and the ciphertext. A hash sampler module generates an intermediate random value r required for generating the shared secret key and the ciphertext using the coin value and the encapsulation key generated in a key generation process. Then, encapsulation is performed using the coin value, the intermediate random value r, and the encapsulation key. Encryption generates a transpose matrix A using a rejection sampler and acquires error values r, e1, and e2 using a binomial sampler. Then, a generated error value R is converted to an NTT domain through an integrated NTT&INTT module, which is used to perform polynomial addition and multiplication through a point-wise multiplier and adder. Here, an intermediate operation value may be stored in RAM to enable polynomial multiplication to proceed smoothly. A ciphertext value and the shared secret key generated in this manner need to be print out. Here, a security level is provided by adjusting the number of times that the transpose matrix A and the error values s and e are repeatedly generated.

Figure 7:
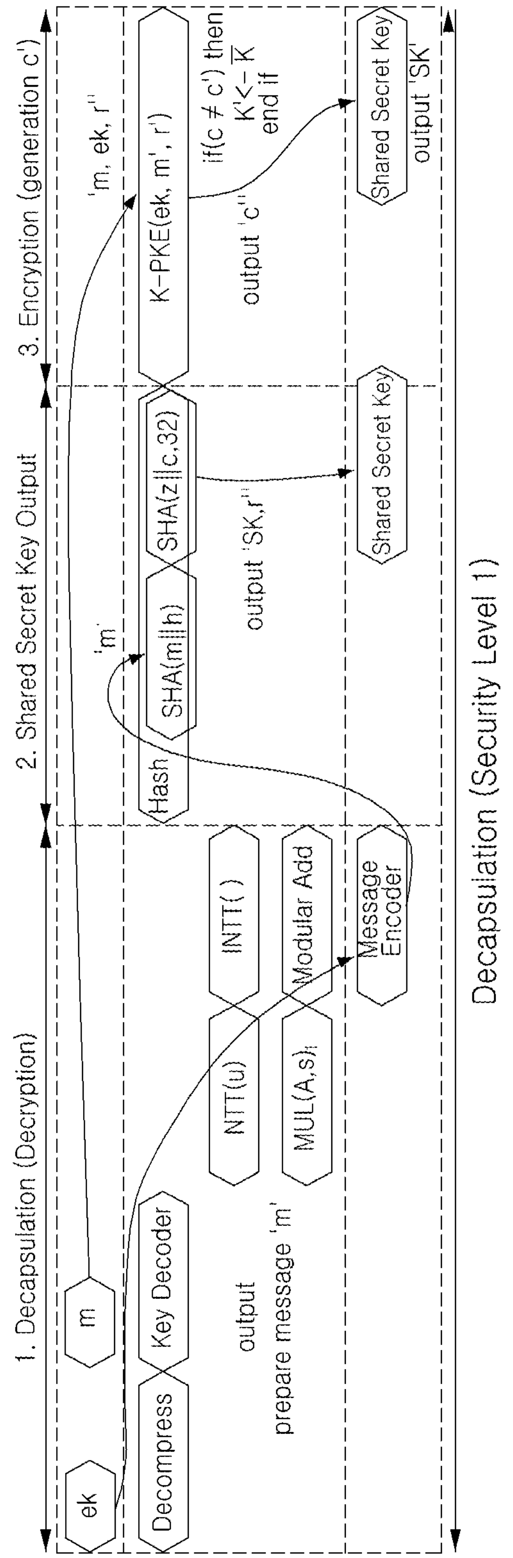
FIG. 7 illustrates data flow of a decapsulation process of an ML-KEM post-quantum cryptography system using memory-based NTT according to an example embodiment.

FIG. 7 illustrates data flow of a decapsulation process of an ML-KEM post-quantum cryptography system using memory-based NTT according to an example embodiment.

Referring to FIG. 7, the ciphertext and a decapsulation key are received and a decompress module generates a u value and a v value. Also, a decapsulation key value is used to generate an s' value using a key decoder module, and a w value is acquired through multiplication and addition operations using an integrated NTT&INTT module and a point-wise multiplier adder module. The w value is used to acquire a random value m through a message encoder. The m value is used to generate a shared secret key value and a random value r using a hash sampler module. To verify whether the input ciphertext value and the generated shared secret key value are normal, an encapsulation process is repeated using an encapsulation key value extracted from a decapsulation key. Here, the integrity of decapsulation is proven by verifying whether the generated ciphertext value and the input ciphertext value are identical.

Figure 8:
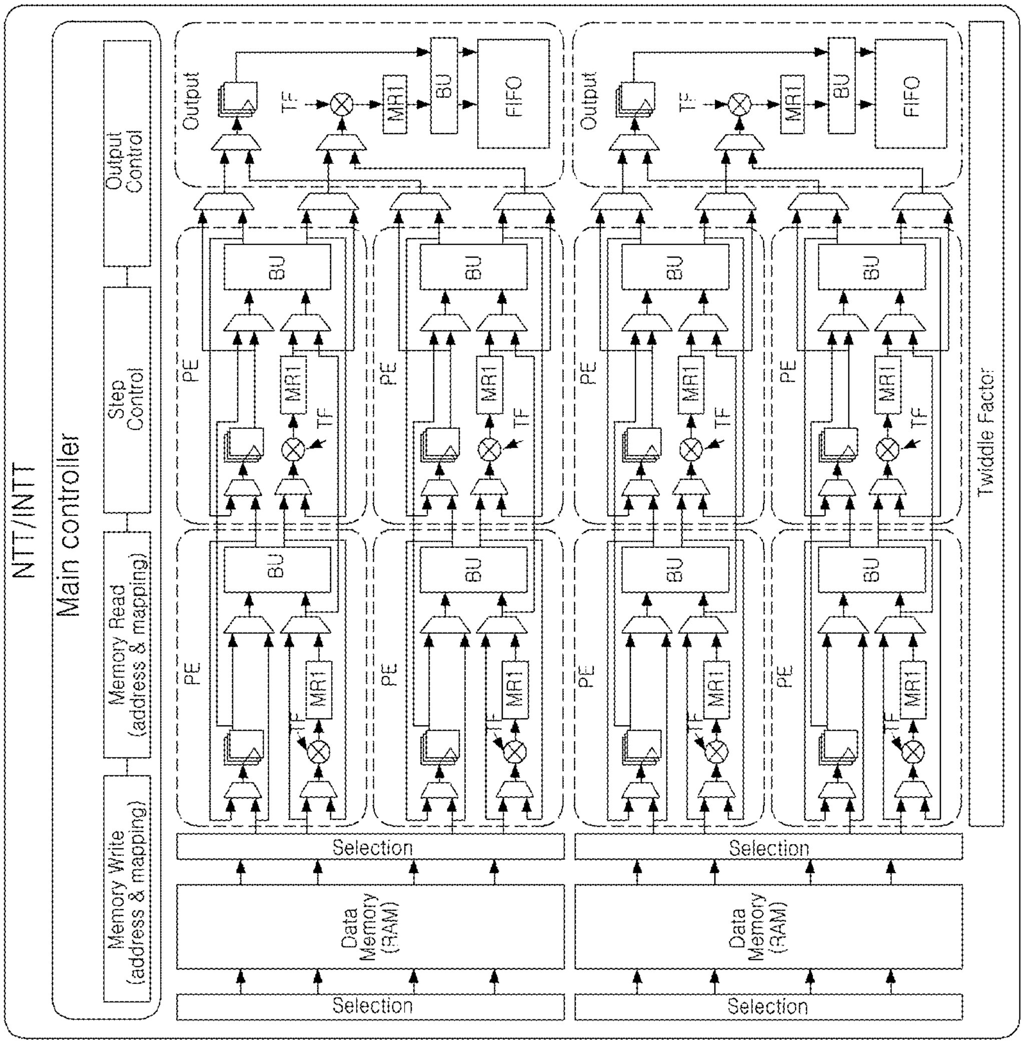
FIG. 8 illustrates a structure of a memory-based integrated NTT&INTT module according to an example embodiment.

FIG. 8 illustrates a structure of a memory-based integrated NTT&INTT module according to an example embodiment.

Referring to FIG. 8, an operation is performed in a 2-parallel pipeline structure according to an example embodiment and an NTT operation is performed by decomposing a form of a general polynomial ring into two rings, an even-order term and an odd-order number. The corresponding structure includes a main controller part in which memory and stage control is performed, a processing element (PE) part in which repetitive operations for a stage are performed, and a read/write part in which data read and data write are performed to perform repetitive operations, and an output part in which a last stage and output are processed.

Figure 9:
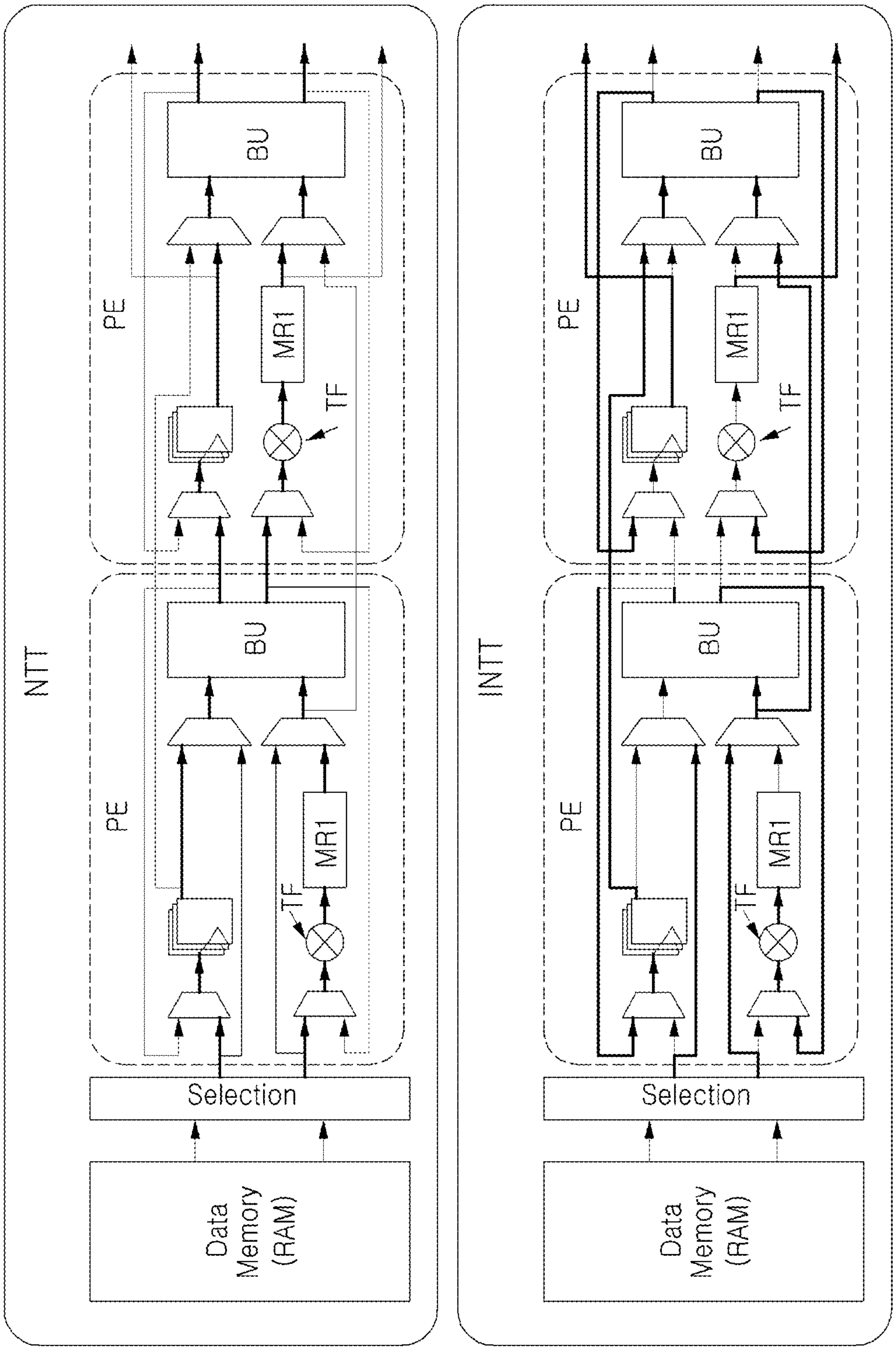
FIG. 9 illustrates an NTT operation and an INTT operation of a memory-based NTT processor device according to an example embodiment.

FIG. 9 illustrates an NTT operation and an INTT operation of a memory-based NTT processor device according to an example embodiment.

According to an example embodiment, it can be known that a logic used for the NTT operation differs from a logic used for the INTT operation.

Figure 10:
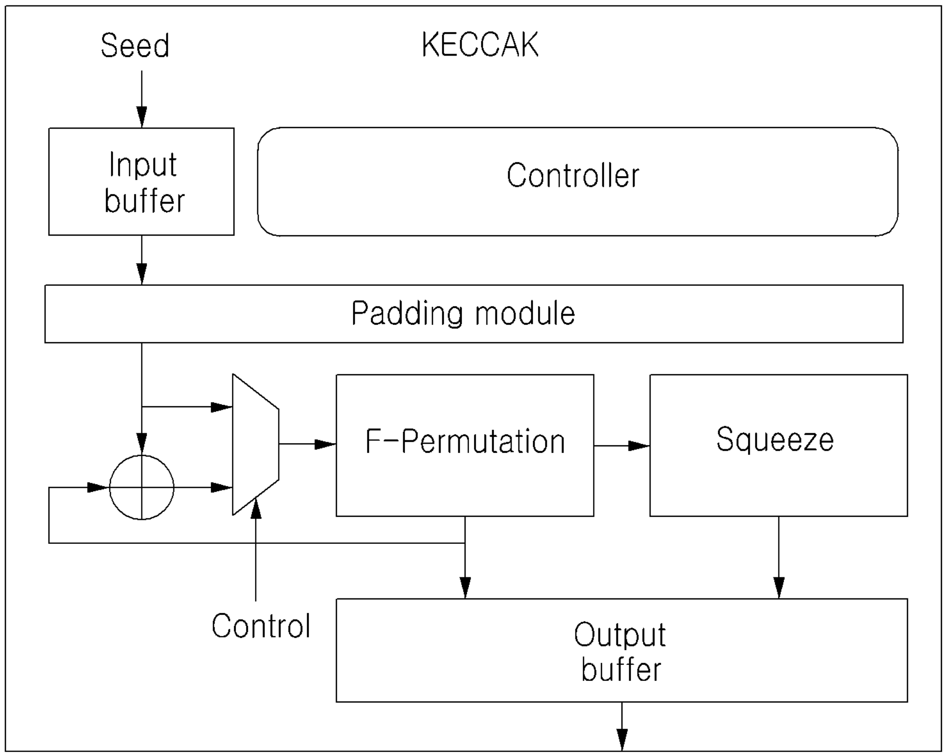
FIG. 10 illustrates a structure of a KECCAK device that is an internal operation module according to an example embodiment.

FIG. 10 illustrates a structure of a KECCAK device that is an internal operation module according to an example embodiment.

According to an example embodiment, a hash sampler module receives a seed value, pads the same with 1600 bits in a padding module, and then outputs a has value through permutation and squeeze processes.

Figure 11A:
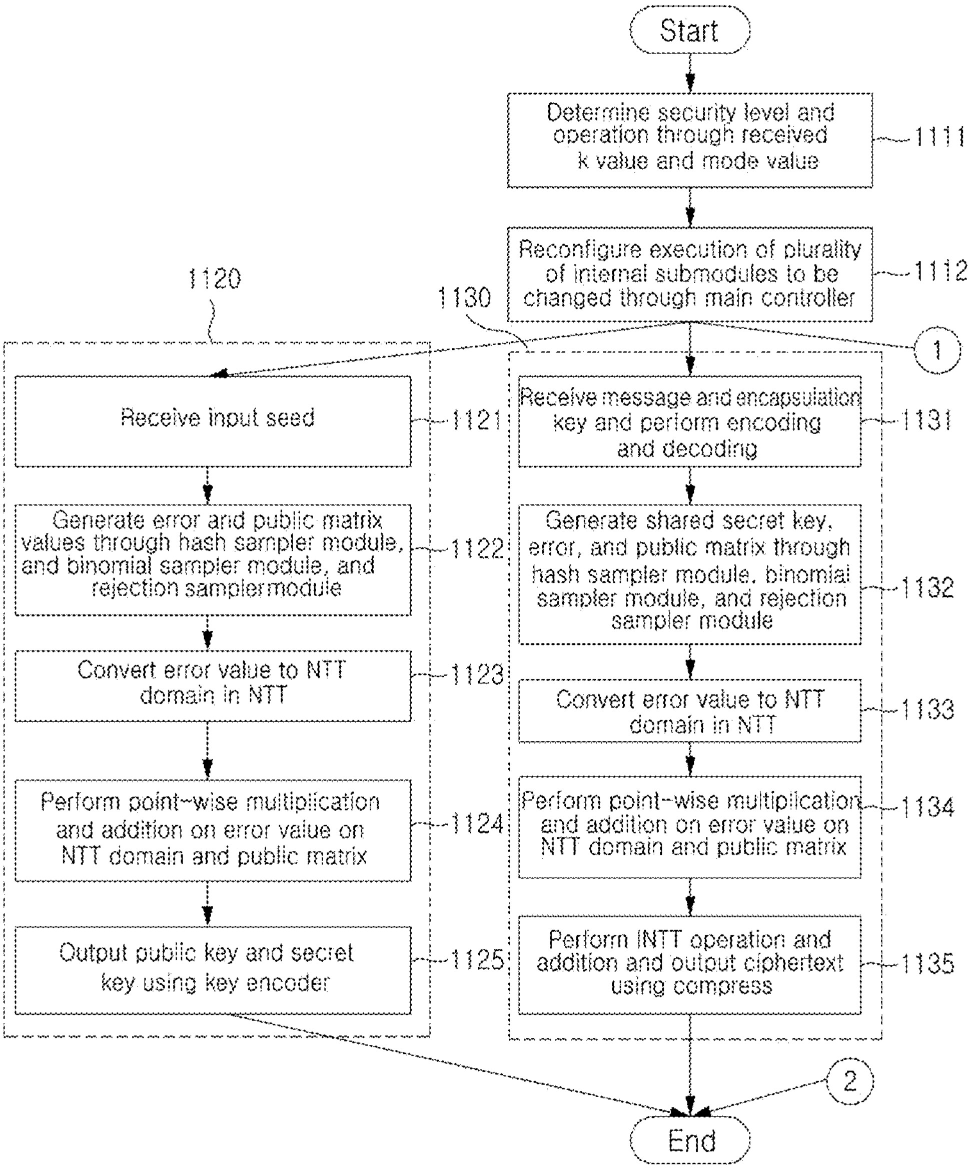
FIG. 11A is a flowchart illustrating an ML-KEM post-quantum cryptography method using memory-based NTT according to an example embodiment.

FIG. 11A is a flowchart illustrating an ML-KEM post-quantum cryptography method using memory-based NTT according to an example embodiment.

Figure 11B:
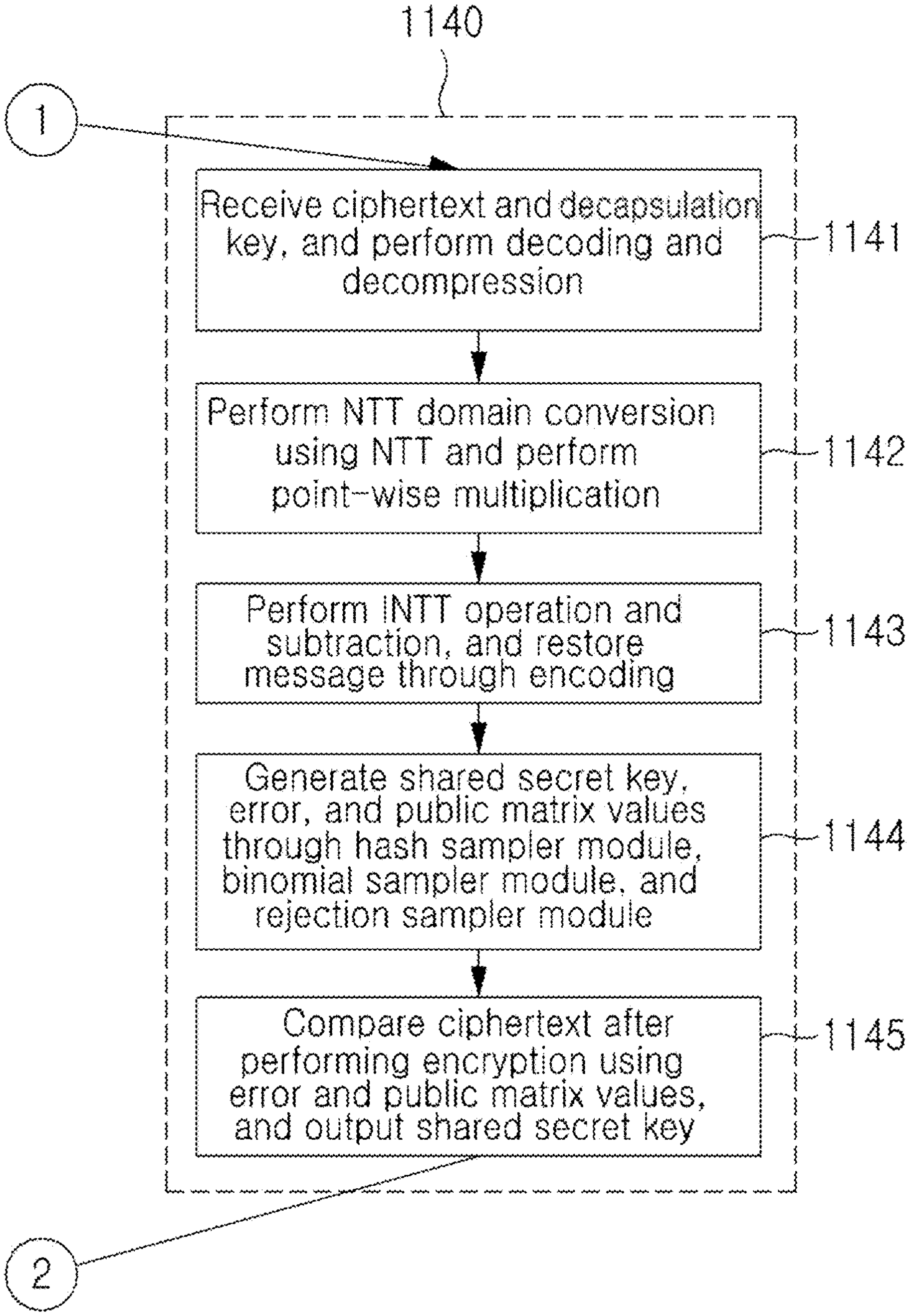
FIG. 11B is a flowchart illustrating an ML-KEM post-quantum cryptography method using memory-based NTT according to another example embodiment.

FIG. 11B is a flowchart illustrating an ML-KEM post-quantum cryptography method using memory-based NTT according to another example embodiment.

The ML-KEM post-quantum cryptography method using memory-based NTT according to an example embodiment includes reconfiguring a plurality of internal submodules by variably selecting one security level from among a plurality of security levels (operation 1111); reconfiguring execution of the plurality of internal submodules to be changed through a main controller (operation 1112); and variably processing data according to the selected security level (stages 1, 3, and 5) to perform key generation, encapsulation, and decapsulation through the reconfigured plurality of internal submodules (operations 1120, 1130 and 1140).

Referring to FIG. 11A, in operation 1111, the plurality of internal submodules is reconfigured by determining a security level and operation through a received security level value (k) and a mode value and by variably selecting one security level from among the plurality of security levels. In operation 1112, reconfiguration is performed to change execution of the plurality of internal submodules through the main controller.

According to an example embodiment, since, as a value of a parameter k of adjusting a size of a matrix of data increases, a size of a key used increases, data throughput increases, a security level increases, the plurality of security levels is variably selected by adjusting the value of the parameter k.

A process (1120, 1130, and 1140) of variably processing data according to the selected security level (levels 1, 3, and 5) to perform key generation, encapsulation, and decapsulation operations through the reconfigured plurality of internal submodules is further described.

At the security level (stage 1) according to an example embodiment, an input seed is received (operation 1121) and error and public matrix values are generated through a hash sampler module, a binomial sampler module, and a rejection sampler module (operation 1122). NTT converts the error value to an NTT domain (operation 1123), and point-wise multiplication and addition are performed on the error value on the NTT domain and the public matrix (operation 1124). A public key and a secret key are output using a key encoder (operation 1125).

At the security level (stage 3) according to an example embodiment, after receiving a message and an encapsulation key, encoding and decoding are performed (operation 1131). Through the hash sampler module, the binomial sampler module, and the rejection sampler module, shared secret key, error, and public matrix values are generated (operation 1132). NTT converts the error value to the NTT domain (operation 1133), and point-wise multiplication and addition are performed on the error value on the NTT domain and the public matrix (operation 1134). An INTT operation and addition are performed, and the ciphertext is output using a compress (operation 1135).

Referring to FIG. 11B, at the security level (stage 5) according to an example embodiment, the ciphertext and a decapsulation key are received and decoding and decompression are performed (operation 1141). NTT domain conversion and point-wise multiplication using NTT are performed (operation 1142), the INTT operation and subtraction are performed, and the message is restored through compression and encoding (operation 1143). Through the hash sampler module, the binomial sampler module, and the rejection sampler module, shared secret key, error, and public matrix values are generated (operation 1144). After performing encryption using the error and public matrix values, the ciphertext is compared and a shared secret key is output (1145).

The apparatuses described herein may be implemented using hardware components, software components, and/or a combination of the hardware components and the software components. For example, the apparatuses and the components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of the processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, virtual equipment, a computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer devices and recorded in computer-readable media. The media may include, alone or in combination with program instructions, data files, data structures, and the like. The program instructions stored in the media are specially designed and configured for the example embodiments and may be known to those skilled in the computer software art and thereby available. Examples of the media include magnetic media such as hard disks, floppy disks, and magnetic tapes; optical media such as CD-ROM and DVDs; magneto-optical media such as floptical disks; and hardware devices that are configured to store program instructions, such as read-only memory (ROM), random access memory (RAM), flash memory, and the like. Examples of the program instruction may include a machine code as produced by a compiler and include a high-language code executable by a computer using an interpreter and the like.

Although the example embodiments are described with reference to some specific example embodiments and accompanying drawings, it will be apparent to one of ordinary skill in the art that various alterations and modifications in form and details may be made in these example embodiments without departing from the spirit and scope of the claims and their equivalents. For example, suitable results may be achieved if the described techniques are performed in different order, and/or if components in a described system, architecture, device, or circuit are combined in a different manner, and/or replaced or supplemented by other components or their equivalents.

Therefore, other implementations, other example embodiments, and equivalents of the claims are to be construed as being included in the claims.

What is claimed is:

1. A post-quantum cryptography method of a post-quantum cryptography system comprising a plurality of internal submodules, the post-quantum cryptography method comprising:

variably selecting one security level from among a plurality of security levels, and reconfiguring the plurality of internal submodules according to the selected security level;

reconfiguring, through a main controller, execution of the plurality of internal submodules; and variably processing data according to the selected security level to perform key generation, encapsulation, and decapsulation operations through the reconfigured plurality of internal submodules;

wherein the reconfiguring the plurality of internal submodules by variably selecting the one security level from among the plurality of security levels comprises variably selecting the one security level from among the plurality of security levels by adjusting a value of a parameter (k), wherein an increase in the value of the parameter (k) for adjusting a matrix size of data corresponds to an increase in a key size, data throughput, and the selected security level;

wherein the reconfiguring the execution of the plurality of internal submodules through the main controller comprises:

configuring a public key, a secret key, and an error value as vectors of the value of the parameter (k) for adjusting the matrix size of the data, to perform the key generation, the encapsulation, and the decapsulation for the selected security level among the plurality of security levels using the plurality of internal submodules through adjustment of the value of the parameter (k), to perform both an NTT operation and an INTT operation without a change in an internal configuration of an integrated NTT & INTT module performing a polynomial multiplication operation and a reduction operation;

configuring a hash sampler module to generate a pseudo-random number using an arbitrary input or a public seed input from a key decoder, and to output the generated pseudo-random number through a squeeze function;

configuring a binomial sampler module to process bits differently depending on the selected security level as a sampling method using a principle of binomial distribution, and to generate the error value using the generated pseudo-random number by using a subtraction operation;

configuring a rejection sampler module to generate a polynomial matrix that is a public matrix for public key generation and encryption, and a transpose matrix thereof, by receiving the generated pseudo-random number and performing extraction and rejection sampling as a sampling method using a principle of probability distribution;

configuring a key encoder to perform encoding with the public key and the secret key;

configuring the key decoder to perform decoding on the public key and the secret key;

configuring a message encoder to convert elements of a polynomial ring of the generated polynomial matrix to a message in bytes;

configuring a message decoder to convert a mask of the message in bytes acquired as an operation result to elements of the polynomial ring;

configuring a compress module to output an input ciphertext in a format for transmission according to the selected security level, to perform shift, addition, and division operations on an operation result within an encryption process according to the selected security level, and to compress and encode a size of the ciphertext through serialization in predetermined bit units;

configuring a decompress module to receive the compressed ciphertext to reduce an error rate and to decompress the compressed ciphertext according to the selected security level to fit the elements of the polynomial ring, to perform multiplication, addition, and shift operations on an operation result within a decryption process according to the selected security level, and to decompress and decode the compressed ciphertext to be operable by converting to elements of a ring;

configuring the integrated NTT & INTT module to receive outputs of the binomial sampler module and the decompress module as inputs and to perform the NTT and INTT operations; and configuring a point-wise multiplier and adder to perform a bow-tie multiplication operation and addition on a polynomial value using a plurality of multipliers and a plurality of adders, and to perform a variable accumulation operation depending on the matrix size of the data according to the selected security level; and wherein the variably processing the data according to the selected security level comprises:

in response that the selected security level is 1, performing:

receiving the public seed;

generating, through the hash sampler module, the binomial sampler module, and the rejection sampler module, the error value and the transpose matrix corresponding to the security level 1;

converting, through the integrated NTT & INTT module, the error value corresponding to the security level 1 to an NTT domain;

performing, through the point-wise multiplier and adder, point-wise multiplication and addition on the transpose matrix and the error value converted to the NTT domain corresponding to the security level 1; and encoding, using the key encoder, the public key and the secret key corresponding to the security level 1, and outputting the encoded public key and the encoded secret key; in response that the selected security level is 3, performing:

performing encoding and decoding after receiving an input message and an encryption key that is a portion of a decapsulation key value;

generating, through the hash sampler module, the binomial sampler module, and the rejection sampler module, a shared secret key as the secret key, the error value, and the transpose matrix corresponding to the security level 3;

converting, through the integrated NTT & INTT module, the error value corresponding to the security level 3 to an NTT domain;

performing, through the point-wise multiplier and adder, point-wise multiplication and addition on the transpose matrix and the error value converted to the NTT domain corresponding to the security level 3; and performing an INTT operation and addition on a result of the point-wise multiplication and addition of the transpose matrix and the error value converted to the NTT domain corresponding to the security level 3, and generating and outputting a generated ciphertext corresponding to the security level 3 through the compress module; in response that the selected security level is 5, performing:

receiving a ciphertext and a decryption key, and performing decoding and decompression;

performing, through the integrated NTT & INTT module and the point-wise multiplier and adder, conversion to an NTT domain and point-wise multiplication on a result of the decoding and decompression;

performing an INTT operation and subtraction on a result of the conversion to the NTT domain and the point-wise multiplication, and restoring a message through the compress module and encoding; and generating, through the hash sampler module, the binomial sampler module, and the rejection sampler module, a shared secret key as the secret key, the error value, and the transpose matrix corresponding to the security level 5.

* * * * *